United States Patent
Koide et al.

(10) Patent No.: US 6,938,341 B2
(45) Date of Patent: Sep. 6, 2005

(54) METHOD FOR MANUFACTURING AN INK DISCHARGE PORT OF AN INK JET RECORDING HEAD

(75) Inventors: Jun Koide, Tokyo (JP); Sadayuki Sugama, Ibaraki (JP); Masao Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 10/174,975

(22) Filed: Jun. 20, 2002

(65) Prior Publication Data

US 2003/0007028 A1 Jan. 9, 2003

(30) Foreign Application Priority Data

Jun. 22, 2001 (JP) ........................................ 2001/190125

(51) Int. Cl.$^7$ ................................................. B32P 17/00
(52) U.S. Cl. ........................ 29/890.1; 29/25.35; 29/611
(58) Field of Search .......................... 29/890.1, 25.35, 29/611; 347/226, 231, 233, 239, 256–260, 45, 47; 219/121, 171, 121.61, 121.6

(56) References Cited

U.S. PATENT DOCUMENTS

| | | | | |
|---|---|---|---|---|
| 4,740,796 A | * | 4/1988 | Endo et al. ..................... | 347/56 |
| 5,263,250 A | | 11/1993 | Nishiwaki et al. ............. | 29/890.1 |
| 5,450,113 A | * | 9/1995 | Childers et al. ............... | 347/87 |
| 5,517,000 A | | 5/1996 | Nishiwaki et al. ............. | 219/121.77 |
| 5,581,285 A | * | 12/1996 | Watanabe et al. .............. | 347/45 |
| 5,940,957 A | * | 8/1999 | Goto et al. .................... | 29/611 |
| 6,012,798 A | * | 1/2000 | Shioya .......................... | 347/41 |
| 6,423,934 B2 | | 7/2002 | Hasegawa et al. ............. | 219/121.71 |
| 6,426,481 B1 | | 7/2002 | Koide et al. ................... | 219/121.71 |

FOREIGN PATENT DOCUMENTS

| | | |
|---|---|---|
| DE | 25 27 079 | 12/1976 |
| EP | 0 624 473 | 11/1994 |
| EP | 1 106 358 | 6/2001 |
| WO | WO 01/22131 | 3/2001 |

* cited by examiner

*Primary Examiner*—Carl J. Arbes
*Assistant Examiner*—Tai Nguyen
(74) *Attorney, Agent, or Firm*—Fitzpatrick, Cella, Harper & Scinto

(57) ABSTRACT

A method for manufacturing an ink discharge port of an ink jet recording head, which is provided with the ink discharge port for discharging an ink liquid droplet for adhesion thereof to a recording medium, a liquid chamber for retaining ink to be supplied to the discharge port, an ink flow path communicating with the discharge port and the liquid chamber, an energy generating element provided for a part of the ink flow path, and an ink supply port for supplying ink from outside to the liquid chamber, includes the step of processing and forming the wall face inside the ink discharge surface of the ink discharge port to a surface condition having irregularities of greater than or equal to 0.3 micrometer and less than or equal to 1 micrometer as the standard deviation value for the surface roughness thereof.

7 Claims, 3 Drawing Sheets

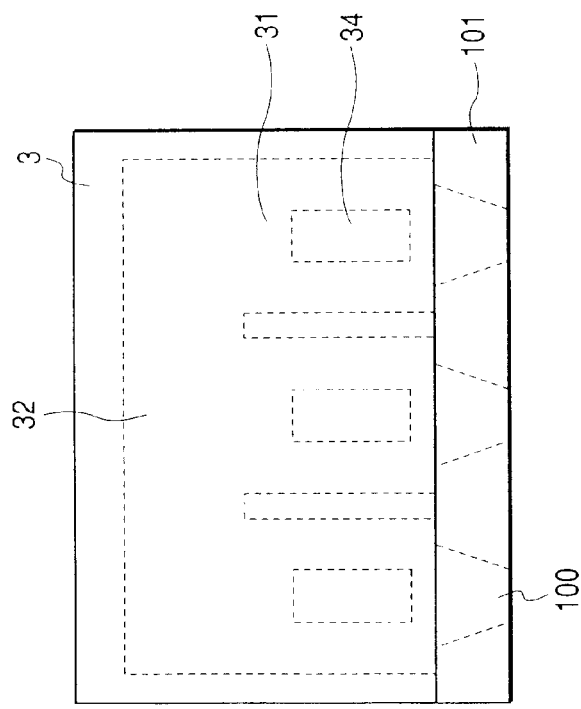
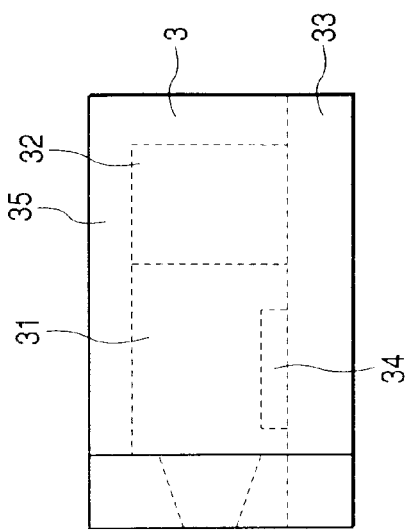
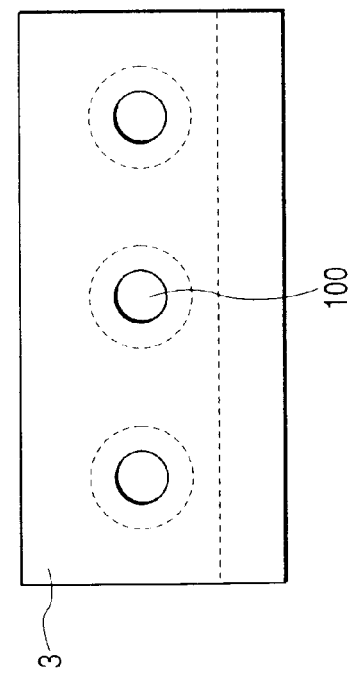

METHOD FOR MANUFACTURING AN INK DISCHARGE PORT OF AN INK JET RECORDING HEAD

BACKGROUND OF THE INVENTION

1. Field of the Invention

The present invention relates to a method for manufacturing the ink discharge port of an ink jet recording head that enables ink droplets to fly and adhere to a recording medium, and also, relates to an ink jet recording head provided with the ink discharge port manufactured by such method of manufacture.

2. Related Background Art

Conventionally, for the processing of the ink discharge port of the ink jet recording head, which is made adaptable to the ink jet recording method, sublimation etching, which cuts the covalent binding of carbon atom by means of photo-chemical reaction, has been in use in recent years with patterning irradiation of excimer laser or some other high-energy ultraviolet laser for the formation of a structure on resin material. It has been in practice, then, to implement a structural formation of the kind by use of such laser beam processing.

Also, as another method thereof, which is called electroforming, non-conductive material is patterned on a conductive base plate, and subsequently, metal is developed in a thick film form by means of electrolysis plating, and then, a hole portion formed on the non-conductive material is used as the ink discharge port, or there is a method in which a thin metallic plate is mechanically punched by use of a hole-type punching die for the formation of the ink discharge port, or there is still another method in which on an IC chip having a source for generating pressure for the ink discharge port, a photosensitive negative resist, which forms the ink discharge port, is coated in a laminating process, and then, the ink discharge port is formed by means of exposure development.

On the other hand, as a method for discharging ink, it has been practiced to make the interior of the ink discharge-port holes hydrophilic to liquid ink, while giving water repellency to liquid ink on the area from the hole-edges to the circumference on the ink discharging side. In this manner, an ink liquid interface is formed on the surface of the ink discharging side by means of liquid surface tension, and with the pressure exerted on liquid ink by use of a mechanically displacing element or thermo-bubbling element, liquid ink retained in the interior of the ink jet is pushed out to enable ink droplets to fly.

In this respect, the wall face of the ink discharge port formed inside the ink discharge surface is finished to be extremely smooth by any one of the methods for processing the ink discharge port, and the wall surface is processed and formed to a state having irregularities of 0.2 micrometer or less as the standard deviation value for the surface roughness thereof.

With the wall face of the ink discharge port thus finished, the flow resistance thereof becomes less, which is preferable in terms of the flowability of ink. However, it has been found recently that from the viewpoint of the ink discharging characteristics of the ink jet recording head, there exists the following drawback:

1. In order to make the recording speed faster, it is necessary to increase the ink discharge frequency. However, there is a limit to the ink discharge frequency due to the fact that unless the meniscus vibration, which is the attenuating vibration of ink liquid surface tension by the surface tension created subsequent to the discharge of an ink liquid droplet, is settled, the next ink liquid droplet cannot be discharged stably. Thus, the ink discharge frequency is determined by the time required for the settling of the meniscus vibration. Ere, if the resistance to ink flow is small, the settling time of the meniscus vibration is made longer eventually.

2. The meniscus vibration that follows ink discharge is generated by the ink supply from the ink liquid chamber, which functions as an ink buffer, to compensate for the volume of ink that has been discharged. Here, if the flow resistance encountered by the ink is small, overshooting takes place by the inertia of fluid movement at the time of such supply, thus making the amount of extrusion of the ink liquid surface greater on the ink discharge surface, that is, the amplitude of meniscus vibration itself is caused to become greater eventually.

3. If the contact area of ink is small with respect to the ink that resides on the wall face of the ink discharge port, ink tends to be peeled off partially from the wall face of the ink discharge port when discharged, and outside air is caught inevitably inside the ink nozzle. As a result, outside air enters the interior of the head as bubble in a gaseous state, which tends to push out liquid ink retained inside the ink jet. Such mixed bubble partially absorbs the pressure exerted by the mechanically displacing element or thermo-bubbling element, hence making it impossible to obtain sufficient ink discharge power eventually.

4. If the contact area of ink is small with respect to the ink that resides on the wall face of the ink discharge port, the attractive force exerted by the hydrophilic contact between ink and the wall face of the ink discharge port is made smaller, and the supplying force of ink from the ink chamber serving as the ink buffer, which compensates for the volume of ink that has been discharged, is made weaker, thus lowering the supplying speed of the ink.

Now, if the flow resistance of the wall face of ink discharge port is small, such obstacles as described above are encountered when it is attempted to make the recording speed higher by increasing the ink discharge frequency. Also, such problems as described above are encountered as those related to ink discharges.

SUMMARY OF THE INVENTION

The present invention is, therefore, designed to solve the above problems. It is an object of the invention to provide a method for manufacturing an ink jet recording head capable of increasing recording speed with higher discharge frequency of ink liquid droplets, while preventing such drawbacks as result in the inability to obtain sufficient ink discharge power due to bubble capture or the like caused by mixture of the outside air, and also, to provide an ink jet recording head having an ink discharge port manufactured by such method of manufacture.

In order to achieve the object described above, the method for manufacturing an ink discharge port of an ink jet recording head, which is provided with an ink discharge port for discharging an ink liquid droplet for adhesion thereof to a recording medium, a liquid chamber for retaining ink to be supplied to the discharge port, an ink flow path communicated with the discharge port and the liquid chamber, an energy generating element provided for part of the ink flow path, and an ink supply port for supplying ink from outside to the liquid chamber, comprises the step of processing and forming the wall face inside the ink discharge surface of the ink discharge port to achieve a surface condition having irregularities greater than or equal to 0.3 micrometer and less than or equal to 1 micrometer as the standard deviation value for the surface roughness thereof.

In accordance with the present invention, it is possible to implement a method of manufacture for an ink discharge port of an ink jet recording head capable of enhancing recording speed with increased discharge frequency of ink liquid droplets, while preventing such drawbacks that may bring about the inability to obtain sufficient ink discharge power due to bubble capture or the like caused by mixture of the outside air, as well as an ink jet recording head provided with the ink discharge port manufactured by such method of manufacture.

BRIEF DESCRIPTION OF THE DRAWINGS

FIGS. 4A, 4B, and 4C are views that schematically illustrate the principal part of an ink jet head provided with the ink discharge port made by the processing apparatus embodying the present invention.

DETAILED DESCRIPTION OF THE PREFERRED EMBODIMENT

With the structure described above, the recording speed can be increased with higher discharge frequency of ink liquid droplets. Also, it is made possible to solve the problem that ink discharge is disabled by bubble capture caused by mixture of outside air as described earlier.

In this respect, the aforesaid laser used here is the one disclosed in *A Compilation of the Next Generation Optical Technologies* (published by Optronics K.K. in 1992, Chapter 1 Element Technologies; Ultra-short pulse generation and compression, pages 24 to 31) and others, that is, the so-called femto-second laser. With the femto-second laser, the concentration of temporal energy becomes extremely large, and also, the irradiation time of the laser beam becomes extremely short. As a result, the processing steps of sublimating ablation can be completed before the laser beams are dispersed in a workpiece as thermal energy, thus causing no fusion to deform the shape to be processed, so as to permit the performance of highly precise processing. With a laser of this kind, the concentration of temporal energy is significantly increased (among those laser oscillators generally available on the market, there is the one the pulse emission time of which is 150 femtoseconds or less, the light energy per pulse being 800 microjoules or more; that is, the energy concentration of the emitted laser beam reaches a level of as high as approximately 5.3 gigawatts in terms of the oscillated pulse). Also, with the extremely short irradiation time of the laser, the sublimating ablation process can be finished before the laser beams are dispersed in a workpiece as thermal energy.

By the utilization of a laser having the characteristics described above, it becomes possible to concentrate energy even for metals having a high thermal conduction rate, ceramics, and minerals (such as silicon). As a result, a multiple photon absorption process is created to make processing easier. Thus, even those materials having a low light absorption factor, such as glass or quartz, and optical crystal, can be processed if only they have an absorption factor of approximately 0.1 to 1%.

As described above, the high-output type femtosecond laser is a high-output laser oscillating system that emits laser beams at a pulse emission time of 1 picosecond or less. The optical ablation processing using this system is extremely effective as a micro-processing method, which is not affected by any particular limitation as to the material to be processed.

Now, hereinafter, in conjunction with the accompanying drawings, the embodiment will be described in accordance with the present invention.

At first, using FIG. 1, a brief description will be made of the configuration of the wall face of an ink discharge port of an ink jet recording head embodying the invention.

Figure 1:
FIG. 1 is a view that shows the processing condition of an ink discharge port portion in accordance with one embodiment of the present invention.

The discharge port shown in FIG. 1 is manufactured in the following manner: the phase differentiating element, which gives a phase difference of electromagnetic wave having $\frac{1}{4}\pi$ phase difference, is arranged on the optical path for the laser beam in a state of linear polarization, which is emitted from a laser oscillator that emits at approximately 200 femtoseconds in the direction from the top to the bottom in FIG. 1, and then, the light polarization is converted into an elliptical polarization of light having an elliptic ratio of 2:1, thus irradiating the laser beam on an orifice plate formed by amorphous silicon nitride with an energy concentration of approximately 100 terawatts/cm$^2$ through an optical system that projects a photo-mask provided with circularly patterned apertures for producing ink discharge ports. The details of the setting parameters are: the numerical aperture (NA) for laser irradiation is 0.6; the focal point is the surface of the orifice plate on the side to be processed; the diameter of the processed hole is $\phi$20 micrometers; the laser irradiation energy is approximately 60 microjoules/pulse; the laser wavelength is 775 nanometers; the repeat frequency of pulse irradiation is 1,000 Hz, and then, 3,000 pulses are irradiated on an orifice plate 20 micrometers thick.

The wall face of the ink discharge port incorporated in the thick portion of an orifice plate 101 (see FIG. 2) is formed irregularly, and the value of the standard deviation of the surface roughness is approximately 0.3 micrometer. The cycle of irregularity on the wall face in the ink flowing direction, that is, substantially the direction in which ink is discharged, is approximately 1.3 micrometers. The cycle of irregularity in the direction toward the outer circumference of the ink discharge port section, which is perpendicular to the ink discharge direction, is formed at an average value of approximately 2.5 micrometers.

As described above, the ablation processing, which uses a laser pulse having a large spatial and temporal energy concentration at a pulse emission time of 1 picosecond or less, provides an etching process of extremely short time duration. Consequently, there occurs almost no propagation as thermal energy, hence making it possible to execute sublimation etching without fusing the workpiece at all. Therefore, micro-cracks tend to occur on the processed surface. Conceivably, then, this ensues in the formation of the surface condition of the wall face of the ink discharge port as shown in FIG. 1.

In this manner, the contact area with ink becomes greater, and the attracting force per unit area. exerted by the hydrophilic contact between the ink and the wall face of the ink discharge port becomes greater accordingly, hence increasing the flow resistance encountered by the ink.

Also, it is possible to adjust and control the surface condition by changing the states of polarization of the laser beam by use of the phase differentiating element.

Also, etching advances in the direction of laser irradiation. As a result, there is a tendency that the workpiece is chipped in the advancing direction of the etching. Here, the micro-cracking tends to occur in the direction perpendicular to the etching direction. In other words, the micro-cracking occurs more easily in the direction perpendicular to the ink discharge direction. Therefore, the value of the standard deviation of the irregularities of the surface roughness is made greater in the ink flow direction, which is substantially the direction of ink discharges, than in the circumferential direction of the ink discharge section, which is perpendicular to the ink discharge direction. This makes it easier to trap (retain) ink in the ink discharge direction. Conceivably, then, it produces an effect of increasing the ink flow resistance particularly in the ink discharge direction.

Next, in conjunction with FIG. 2, the description will be made of a method for processing and forming the ink discharge port on the orifice plate 101.

Figure 2:
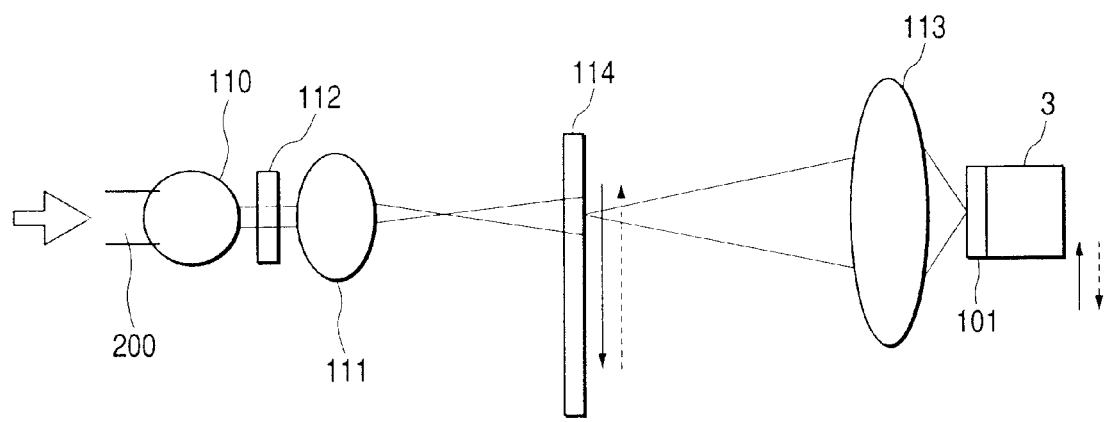
FIG. 2 is an optically schematic view that shows a laser processing apparatus in accordance with one embodiment of the present invention.

FIG. 2 is an optically schematic view that shows a laser processing apparatus for processing and forming the aforesaid ink discharge port.

From the main body of a short pulse laser oscillator (not shown), laser flux 200 is emitted in the direction indicated by a thick arrow in FIG. 2, and led to a zoom beam compressor 110 where it is converted into laser flux having a designated beam diameter. Next, after the light polarization state is converted by means of phase differentiating element 112, the laser flux is led to a mask illumination lens 111 for the formation of a laser beam having a designated convergent angle, thus illuminating a part of mask pattern portion 115 of a photo-mask 114 shown in FIG. 3. At this juncture, the effective NA (numerical aperture) is determined by the compression ratio of the zoom beam compressor 110 and the focal length of the mask illumination lens 111. Depending on the NA thus determined, the taper angle of the workpiece is determined. To describe it the other way around, the compression ratio of the zoom beam compressor 110 and the focal length of the mask illumination lens 111 are determined or adjusted by the processing shape of the workpiece.

Figure 3:
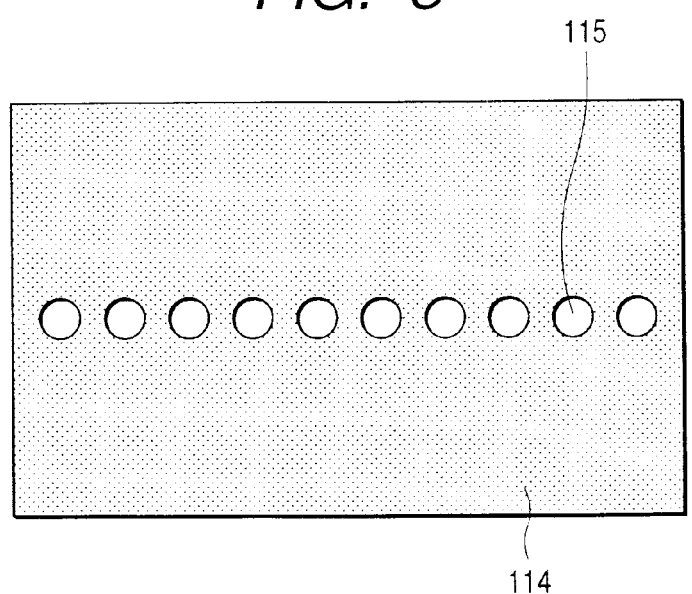
FIG. 3 is a view that shows the pattern of a photo-mask used for the laser processing apparatus in accordance with one embodiment of the present invention.

On the other hand, the laser beam that has passed through the mask pattern 115 of the photo-mask 114 shown in FIG. 3 is projected and irradiated by a projection lens 113 to the surface of the orifice plate 101 of an ink jet head 3, which is the workpiece, with the patterning image focused thereon, thus processing the ink discharge port by means of laser oscillation. Also, in synchronization with the progressing processing, the photo-mask 114 and the main body of ink jet recording head 3 that includes the orifice plate 101, which is the target workpiece, are arranged to reciprocate by a mechanical stage (not shown) in the directions indicated by the thin arrows in FIG. 2, which is the vertical direction of a designated optical axis at a designated speed at a time and in synchronization, or in the directions indicated by both the thin arrows and the dotted arrows. In this manner, the entire process is executed for the mask pattern 115.

Next, an ink jet head provided with the aforesaid ink discharge port is shown in FIGS. 4A to 4C. In FIGS. 4A to 4C, a reference numeral 33 designates a base plate. On the base plate, an electrothermal converting element, or some other ink discharge pressure-generating element, 34 is installed. The ink discharge pressure-generating element 34 is arranged in the ink flow path 31, which is communicated with the discharge port 100, and each of the ink flow paths 31 is communicated with a common liquid chamber 32.

To the common liquid chamber 32, an ink supply tube (not shown) is connected, and ink is supplied from an ink tank through the ink supply tube.

Also, reference numeral 35 designates a ceiling plate provided with recessed portions to form the ink flow path 31 and the common liquid chamber 32, which forms the ink flow path 31 and the common liquid chamber 32 when bonded to the base plate 33. Further, the bonded body of the base plate 33 and the ceiling plate 35 is provided with the orifice plate 101 having discharge ports 100 on the ink flow path edge portion side.

The ink jet head of this kind can be manufactured as follows.

At first, the heater 34, which is a heat generating resistive element for use in ink discharge pressure generation, integrated circuit (not shown), such as shift registers, and electric wiring are patterned on a silicon base plate, thus producing the base plate 33, while the ceiling plate 35 is produced by forming the recessed portions that become the ink flow paths 31 and common liquid chamber 32, as well as an ink supply port (not shown).

Next, the base plate 33 and the ceiling plate 35 are aligned and bonded so that the edge face on the ink discharge side and the arrangement of ink flow paths 31 and heaters 34 are in agreement. After that, the orifice plate 101, for which nozzles are yet to be formed, is adhesively bonded to the edge face on the ink discharge side of the bonded ceiling plate and base plate.

Further, in this state, nozzles are formed by the pattern-projected irradiation by the designated light pulse numbers using the laser processing method described above. Thereafter, terminals (not shown) used for driving the heaters are bonded to the patterned electric base plate, while bonding an aluminum base plate to the base plate 33. Then, a holder that holds each member and an ink tank for supplying ink are bonded to assemble the ink jet head.

Here, it is made possible for the ink jet recording head thus produced to process the wall face of the ink discharge port by controlling the degree of surface roughness thereof, because the condition of light polarization of the laser beam irradiated to the orifice plate 101 can be converted by use of the phase differentiating element 112. Therefore, the discharge frequency of the ink liquid droplets can be enhanced with given characteristics. Also, this makes it possible to improve the recording speed, while preventing the problem of disabled ink discharge that may take place if a bubble is caught by mixture of the outside air, hence implementing highly reliable high-speed printing with increased recording speed.

What is claimed is:

1. A method for manufacturing an ink discharge port of an ink jet recording head provided with the ink discharge port for discharging an ink liquid droplet for adhesion thereof to a recording medium, a liquid chamber for retaining ink to be supplied to the discharge port, an ink flow path communicating with the discharge port and the liquid chamber, an energy generating element provided for a part of the ink flow path, and an ink supply port for supplying ink from outside to the liquid chamber, comprising the step of:

processing and forming a wall face inside an ink discharge surface of the ink discharge port to a surface condition having irregularities of not less than 0.3 micrometers and not more than 1 micrometer as the standard deviation value for the surface roughness thereof, wherein the ink discharge port is processed and formed by a laser beam emitted from a laser oscillator continuously emitting laser light pulses of large spatial and temporal energy concentration at a pulse emission time of 1 picosecond or less, for irradiating a designated pattern image at a designated energy concentration with a designated numerical aperture (NA) at a designated focal point.

2. A method for manufacturing an ink discharge port according to claim 1, wherein the standard deviation value of irregularities for the surface roughness of the wall face of the ink discharge port is greater in an ink flow direction, which direction is substantially a direction of ink discharge, than in an outer circumferential direction of the ink discharge port, which direction is perpendicular to the ink discharge direction.

3. A method for manufacturing an ink discharge port according to claim 1, wherein the irregularity cycle of the surface condition of the wall face of the ink discharge port is 2 micrometers or less on the average in the ink flow direction, which direction is substantially the direction of ink discharge.

4. A method for manufacturing an ink discharge port according to claim 1, wherein the irregularity cycle of the surface condition of the wall face of the ink discharge port is 5 micrometers or less on the average in the outer circumferential direction of the ink discharge port, which direction is perpendicular to the ink discharge direction.

5. A method for manufacturing an ink discharge port according to claim 1, wherein the energy concentration of the irradiating laser beam satisfies the the following inequality:

$$(a \times n \times E)/t > 13 \times 10^6 (W/cm^2)$$

where a is the absorption factor of material used for forming the ink discharge port with respect to the wavelength of the irradiating laser; n is the numerical aperture (NA) on a workpiece side of an optical system projecting the processing pattern on an orifice plate for forming the ink discharge port; E is the energy per unit area of the laser beam to be irradiated on the material of the workpiece for forming the ink discharge port, per unit oscillation pulse time ($J/cm^2$/pulse); and t is the duration of the laser oscillation pulse time (sec).

6. A method for manufacturing an ink discharge port according to claim 1, wherein the laser oscillator emitting the laser beam at the pulse emission time of 1 picosecond or less is provided with a space compression device for light propagation.

7. A method for manufacturing an ink discharge port according to claim 6, wherein the space compression device for light propagation comprises means for generating a chirping pulse, and vertical mode synchronizing means utilizing light wavelength dispersion characteristics.

* * * * *

UNITED STATES PATENT AND TRADEMARK OFFICE
CERTIFICATE OF CORRECTION

PATENT NO. : 6,938,341 B2
DATED : September 6, 2005
INVENTOR(S) : Jun Koide et al.

It is certified that error appears in the above-identified patent and that said Letters Patent is hereby corrected as shown below:

Title page,
Item [56], References Cited, insert
-- OTHER PUBLICATIONS
Patent Abstracts of Japan, Vol. 017, No. 552, (M-1491), Oct. 5, 1993 (JP 5-155028, June 22, 1993) --.

Column 2,
Line 1, "which,is" should read -- which is --.
Line 7, "Ere," should read -- Here, --.

Column 3,
Line 52, "With" should read -- ¶ With --.

Column 8,
Line 3, "the" ($3^{rd}$ occurrence) should be deleted.

Signed and Sealed this

Twenty-fourth Day of January, 2006

JON W. DUDAS
*Director of the United States Patent and Trademark Office*